(12) United States Patent  (10) Patent No.: US 8,139,124 B2
Nakamura  (45) Date of Patent: Mar. 20, 2012

(54) ERRONEOUS ERASURE DETERMINATION APPARATUS, METHOD AND COMPUTER PROGRAM PRODUCT, AND IMAGE FILE GENERATION APPARATUS

(75) Inventor: Satoshi Nakamura, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 620 days.

(21) Appl. No.: 12/285,301

(22) Filed: Oct. 1, 2008

(65) Prior Publication Data

US 2009/0091638 A1  Apr. 9, 2009

(30) Foreign Application Priority Data

Oct. 3, 2007  (JP) .................................. 2007-259659

(51) Int. Cl.
*H04N 5/76* (2006.01)
(52) U.S. Cl. .................................................. 348/231.2
(58) Field of Classification Search ................. 348/231.2
See application file for complete search history.

(56) References Cited

U.S. PATENT DOCUMENTS

| | | | | |
|---|---|---|---|---|
| 5,983,229 | A * | 11/1999 | Houchin et al. | 370/474 |
| 6,297,870 | B1 * | 10/2001 | Nanba | 355/18 |
| 6,624,909 | B1 * | 9/2003 | Czyszczewski et al. | 358/1.17 |
| 7,508,534 | B2 | 3/2009 | Dokuni | |
| 7,733,385 | B2 | 6/2010 | Watanabe et al. | |
| 2002/0071606 | A1 * | 6/2002 | Watanabe et al. | 382/177 |
| 2005/0073711 | A1 * | 4/2005 | Dokuni | 358/1.14 |
| 2006/0136823 | A1 | 6/2006 | Dokuni | |
| 2007/0052979 | A1 * | 3/2007 | Burlingame | 358/1.1 |
| 2007/0139535 | A1 * | 6/2007 | Tsuchida | 348/231.99 |
| 2008/0198219 | A1 * | 8/2008 | Yoshida et al. | 348/43 |

FOREIGN PATENT DOCUMENTS

| | | |
|---|---|---|
| JP | 11-266420 | 9/1999 |
| JP | 2005-110183 | 4/2005 |
| JP | 2005-164832 | 6/2005 |
| JP | 2005-252754 | 9/2005 |
| JP | 2006-13759 | 1/2006 |
| JP | 2006-332824 A | 12/2006 |
| WO | WO-2007/010939 A1 * | 1/2007 |

OTHER PUBLICATIONS

Japanese Office Action dated Nov. 2, 2010, with partial English translation.
European Search Report dated Feb. 4, 2009.
Murray et al.: "Encyclopaedia of Graphics File Formats, Chapter 8" 1996, 0' Reilly, XP002511205 pp. 121-126 and 145.
Morrison, Jerry: "A Quick Introduction to IFF" Oct. 17, 1988 pp. 1-88 XP002511202 Electronic Arts retrieved from the internet: URL: http://www.fileformat.info/format/iff/spec/7899a9f0e53c42309af667c5da3bd426/IFF.TXT> [retrieved on Jan. 19, 2009] sections 1-4, appendix A.

(Continued)

*Primary Examiner* — James Hannett
(74) *Attorney, Agent, or Firm* — McGinn IP Law Group, PLLC (57) ABSTRACT

An erroneous erasure determination apparatus is provided, which determines whether or not image data in an image file are likely to have been erroneously erased based on auxiliary information attached thereto which indicates whether or not the image file is recorded in a multi-page format, and information which indicates the number of image data recorded in the image file.

23 Claims, 8 Drawing Sheets

OTHER PUBLICATIONS

Parulski K et al.: "TIFF/EP, A Flexible Image Format for Electronic Still Cameras" Final Program and Advance Printing of Papers. Annual Conference. Imaging on the Information Superhighway, XX, XX, May 7, 1995 pp. 425-428 XP000646213.

Brown, Christopher L. T.: "Exchangable Image file Format (ExIF)" Technology Pathways, Technical White Paper Oct. 12, 2004 pp. 1-7, XP002511203 retrieved from the internet: URL: http://www.techpathways.com/uploads/ExIF.pdf> [retrieved on Jan. 19, 2009] pp. 1-7.

Cohen, Kevin: "Digital Still Camera Forensics" Small Scale Digital Device Forensics Journal, (Online) vol. 1, No. 1, Jun. 2007 pp. 1-8, XP 002511204 retrieved from internet: URL: http://www.ssddfj.org/papers/SSDDFJ_V1_1_Cohen.pdf> [retrieved on Jan. 19, 2009] sections I.B, I.c, I.E, Tables III-V.

European Search Report dated Mar. 5, 2010.

Apple Inc.: "QuickTime File Format Specification" Sep. 4, 2007, Apple Inc., Cupertino, CA, USA XP002569828 *Figure 3-11, p. 110.

Notification of Reasons of Rejection dated Oct. 26, 2010, with English translation.

* cited by examiner

ERRONEOUS ERASURE DETERMINATION APPARATUS, METHOD AND COMPUTER PROGRAM PRODUCT, AND IMAGE FILE GENERATION APPARATUS

BACKGROUND OF THE INVENTION

1. Field of the Invention

The present invention relates to an erroneous erasure determination apparatus, method, and computer program product for determining the likelihood of erroneous erasure of image data in an image file.

2. Description of the Related Art

Technologies for improving management convenience for a plurality of image data related to each other by recording and managing them as a single image file are known.

For example, Japanese Unexamined Patent Publication No. 2006-013759 proposes a method for generating a stereoscopic image file by storing two image data (left image data and right image data) that form a stereoscopically viewable image with an identifier for delimiting the image data.

Japanese Unexamined Patent Publication No. 11(1999)-266420 proposes a method for combining and recording a serially photographed plurality of image data as a single compressed continuous still image file.

If an image file including a plurality of image data generated by the method proposed in Japanese Unexamined Patent Publication No. 2006-013759 or Japanese Unexamined Patent Publication No. 11(1999)-266420 is edited using image software of image editing device or the like that can recognize only one front image data, however, the image data recorded following the front image data may possibly be erased erroneously.

For example, when a JPEG image file including a plurality of image data delimited by an identifier, EOI marker, between each image data is opened with ancillary software "Windows Image and Fax Viewer" of Microsoft Windows XP, only an image of the front image data is displayed. Then, when the displayed image is rotated in the right or left direction, the image file is overwritten with the rotation processing performed on the front image data and the subsequent image data erroneously erased.

As such, there is a demand for a method of automatically detecting such erroneous erasure in order to reduce the burden on the user for image data management.

In view of the circumstances described above, it is an object of the present invention to provide an erroneous erasure determination apparatus, method and computer program product capable of determining the likelihood of erroneous erasure of image data in an image file.

SUMMARY OF THE INVENTION

The erroneous erasure determination apparatus of the present invention is an apparatus including an erroneous erasure determination means for determining whether or not image data in an image file are likely to have been erroneously erased based on auxiliary information attached thereto which indicates whether or not the image file is recorded in a multi-page format, and information which indicates the number of image data recorded in the image file.

In the apparatus described above, the erroneous erasure determination means may be a means that includes a format judging unit that judges whether or not the image file is a file recorded in the multi-page format based on the auxiliary information, and an image data count judging unit that judges whether or not two or more image data are recorded in the image file, and determines that image data in the image file are likely to have been. erroneously erased when the image file is judged by the format judging unit as recorded in the multi-page format and judged by the image data count judging unit that two or more image data are not recorded in the image file.

Further, the image data count judging unit may be a unit that judges whether or not two or more image data are recorded in the image file judged by the format judging unit as recorded in the multi-page format.

Here, the referent of "image data" in the context of "two or more image data are recorded" means image data recorded as principal data and does not include the other image data, such as the image data of a thumbnail image and the like.

Preferably, the auxiliary information is recorded at a known position of the header of the image file.

Further, the multi-page format may be a recording format in which a plurality of image data are recorded in a single image file delimited by a specific identifier between each image data, and the image data count judging unit may be a unit that judges whether or not two or more image data are recorded in the image file based on whether or not image data are present following the specific identifier first appearing in the image file.

Still further, the erroneous erasure determination means may be a means that, when determined that the erroneous erasure is likely to have occurred, outputs the determination result.

Further, the apparatus described above may further include a display means, and the erroneous erasure determination means may be a means that, when determined that the erroneous erasure is likely to have occurred, outputs the determination result that erroneous erasure is likely to have occurred to the display means to cause the display means to display that image data are likely to have been erroneously erased.

Still further, the erroneous erasure determination means may be a means that, when determined that erroneous erasure is likely to have occurred, attaches auxiliary information to the image file indicating that erroneous erasure of image data is likely to have occurred in the image file.

Further, the specific identifier may be an EOI marker.

The erroneous erasure determination method of the present invention is a method including the step of determining whether or not image data in an image file are likely to have been erroneously erased based on auxiliary information attached thereto which indicates whether or not the image file is recorded in a multi-page format, and information which indicates the number of image data recorded in the image file.

The computer program product of the present invention is a computer readable recording medium on which is recorded a program for causing a computer to perform the step of determining whether or not image data in an image file are likely to have been erroneously erased based on auxiliary information attached thereto which indicates whether or not the image file is recorded in a multi-page format, and information which indicates the number of image data recorded in the image file.

The image file generation apparatus of the present invention method, and computer program product of the present invention, the likelihood of erroneous erasure of image data in an image file may be determined by determining whether or not image data in the image file are likely to have been erroneously erased based on auxiliary information attached thereto which indicates whether or not the image file is recorded in a multi-page format, and information which indicates the number of image data recorded in the image file.

In the erroneous erasure determination apparatus, when a determination is made that erroneous erasure is likely to have occurred in the image file, the determination result maybe outputted to a display means to cause the display means to display that image data are likely to have been erroneously erased, or auxiliary information may be attached to the image file indicating that erroneous erasure of image data is likely to have occurred in the image file, thereby the management capability for image data in an image file recorded in the multi-page format may be improved.

According to the image file generation apparatus of the present invention, the apparatus includes an identification unit for identifying two or more image data desired to be recorded in a multi-page format in which a plurality of image data are recorded in a single image file, and an image file generation unit for generating a single image file by recording auxiliary information at a known position of the header of the image file which indicates that the image file is recorded in the multi-page format and recording the two or more image data identified by the identification unit delimited by a specific identifier between each image data. Thus, an image file generated by the apparatus may be identified whether or not recorded in the multi-page format by referring to the auxiliary information recorded at a known position of the header, and also a determination may be made as to whether or not two or more image data are recorded in the file by checking to see if image data are present following the specific identifier appearing first in the image file. Further, based on these, the likelihood of erroneous erasure of image data in the image file may be determined easily.

In the image file generation apparatus described above, where the identification unit is a unit that identifies two or more image data desired to be recorded in the multi-page format from a plurality of image data based on either one of date and time information attached to each image data and evaluation result of correlation between each image data or both, highly related two or more image data may be recorded in the multi-page format.

DESCRIPTION OF THE PREFERRED EMBODIMENTS

Figure 1:
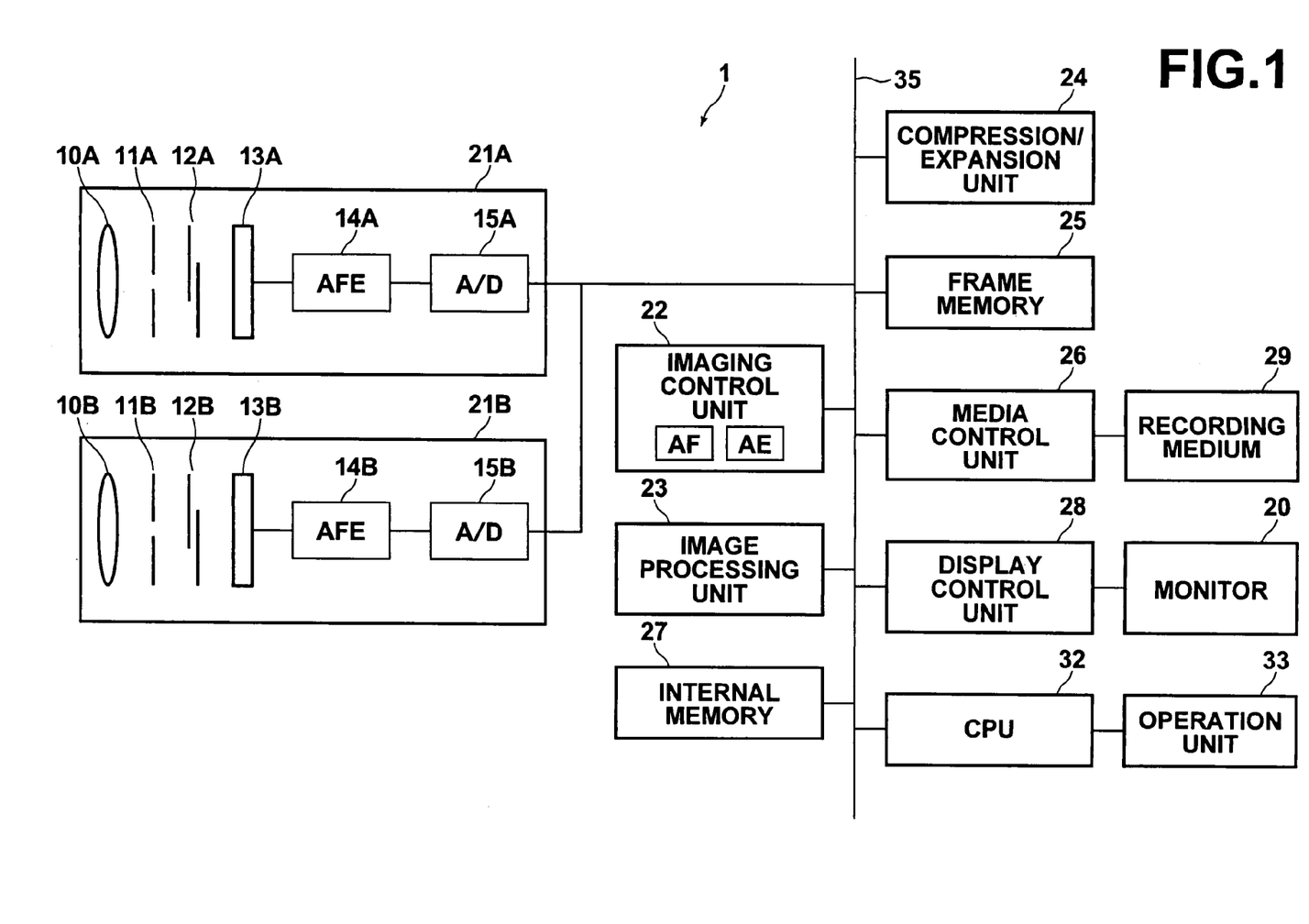
FIG. 1 is a schematic block diagram of a camera system according to the present invention, illustrating a configuration thereof.

Hereinafter, exemplary embodiments of the erroneous erasure determination apparatus and image file generation apparatus of the present invention will be described with reference to the accompanying drawings. FIG. 1 is a schematic block diagram of a camera system 1 to which the erroneous erasure determination apparatus and image file generation apparatus of the present invention are applied, illustrating a configuration thereof.

The camera system 1 includes two imaging units 21A, 21B, an imaging control unit 22, an image processing unit 23, a compression/expansion processing unit 24, a frame memory 25, a media control unit 26, an internal memory 27, a display control unit 28, and the like, which send and receive various signals and data through a data bus 35.

The imaging units 21A, 21B include lenses 10A, 10B, apertures 11A, 11B, shutters 12A, 12B, CCDs 13A, 13B, analog front ends (AFEs) 14A, 14B, and A/D conversion units 15A, 15B respectively. Each of the lenses 10A, 10B includes a plurality of lenses having different functions, such as a focus lens for bringing a subject into focus, a zoom lens for realizing a zoom function, and the like, and their positions are controlled by not shown lens drive units. The aperture diameter of each of the aperture units 11A, 11B is controlled by a not shown aperture drive unit based on aperture value data obtained through AE processing. Each of the shutters 12A, 12B is a mechanical shutter and is driven by a not shown shutter drive unit according to the shutter speed obtained through AF processing. Each of the CCDs 13A, 13B has a photoelectric surface which includes multitudes of light receiving elements arranged two-dimensionally on which subject light is focused and photoelectrically converted, thereby an analog imaging signal is obtained. The AFEs 14A, 14B perform noise elimination processing and gain control processing (collectively referred to as analog processing) on the analog imaging signals outputted from the CCDs 13A, 13B respectively. The A/D conversion units 15A, 15B convert the analog imaging signals analog-processed by the AFEs 14A, 14B to digital signals respectively.

The imaging control unit 22 includes an AF processing unit and an AE processing unit. Where the focus is under adjustable conditions, the AF processing unit determines the positions of the focus lenses of the lenses 10A, 10B based on pre-images obtained by the imaging units 21A, 21B through a halfway depression of the release button, and outputs the determined positions to the imaging units 21A, 21B. The AE processing unit determines aperture values and shutter speeds based on the pre-images, and outputs the determined values to the imaging units 21A, 21B.

The image processing unit 23 performs image processing, such as white balance control, tone correction, sharpness correction, color correction, YC conversion, and the like, on image data obtained by the imaging units 21A, 21B.

The compression/expansion processing unit 24 performs compression processing on the image data processed by the image processing unit 23 in a compression format such as JPEG, and outputs the compressed image data to the frame memory 25.

The frame memory 25 is a work memory used when various types of processing, including the processing performed by the image processing unit, are performed on the image data obtained by the imaging units 21A, 21B.

The media control unit 26 accesses a recording medium 29 to perform read/write control of an image file.

The internal memory 27 has stored therein various constants to be set in the camera system 1, programs to be executed by a CPU 32, and the like.

The display control unit 28 is provided for causing image data stored in the frame memory 25 or image data recorded in the recording medium 29 to be displayed on a monitor 20. Here, the display control unit 28 and monitor 20 constitute a display means.

An operation unit (photographing mode setting means) 33 includes a release button, an operation mode switch, a menu/OK button, a zoom/up-down lever, a left-right button, a back button, display switching button, and the like provided on the body of the camera system 1, and constitutes an input means that allows the user to perform various setting operations. The user may select a photographing mode for photographing performed by the imaging units 21A, 21B by operating the operation unit 33. Further, switching of the operation mode switch allows selection of a recording mode (photographing mode) or a reproduction mode.

Here, the photographing mode includes normal mode, action mode, bracket mode, panorama mode, stereoscopic mode, multiview image mode, and the like.

Normal mode is a mode in which single image data (image data of one image) are obtained by depressing the release button. Action mode is a mode in which photographing is performed continuously while the release button is depressed to obtain a plurality of image data. Bracket mode is a mode in which photographing is performed continuously while various setting values, including the exposure, white balance, focus position, and the like are changed according to predetermined conditions to obtain a plurality of image data. Panorama mode is a mode in which photographing is performed repeatedly while moving the camera system 1 in up-down directions or left-right directions within a range desired to be obtained as a panorama image to obtain a plurality of image data. Stereoscopic mode is a mode in which the same subject is photographed from different angles to obtain two image data stereoscopically viewable with the help of parallax. Here, the same subject is photographed using the imaging units 21A, 21B disposed spaced apart to each other or using either one of them by photographing the subject a plurality of times while changing the position of the imaging unit. Multiview Image Mode is a mode in which the same subject is photographed from various angles to obtain a plurality of image data for building motion capture, obtaining sport event data, and the like.

The CPU 32 controls each unit of the camera system 1 in response to signals from the operation unit 33 and each processing unit.

Hereinafter, image file generation processing through control of the CPU 32 will be described in detail. The CPU 32 receives the setting of photographing mode from the operation unit 33, and stores the setting result in the internal memory. The CPU 32 further identifies two or more image data obtained by either one of the imaging unit 21A, 21B or by both in either one of action mode, bracket mode, panorama mode, stereoscopic mode, and multiview image mode as the image data desired to be recorded in a multi-page format. Then, the CPU 32 causes various processing, such as image processing, compression processing, and the like, to be performed on the identified two or more image data and the processed two or more image data to be recorded in the multi-page format as a single image file, which is then stored in the recording medium 29 through the media control unit 26.

Figure 2:
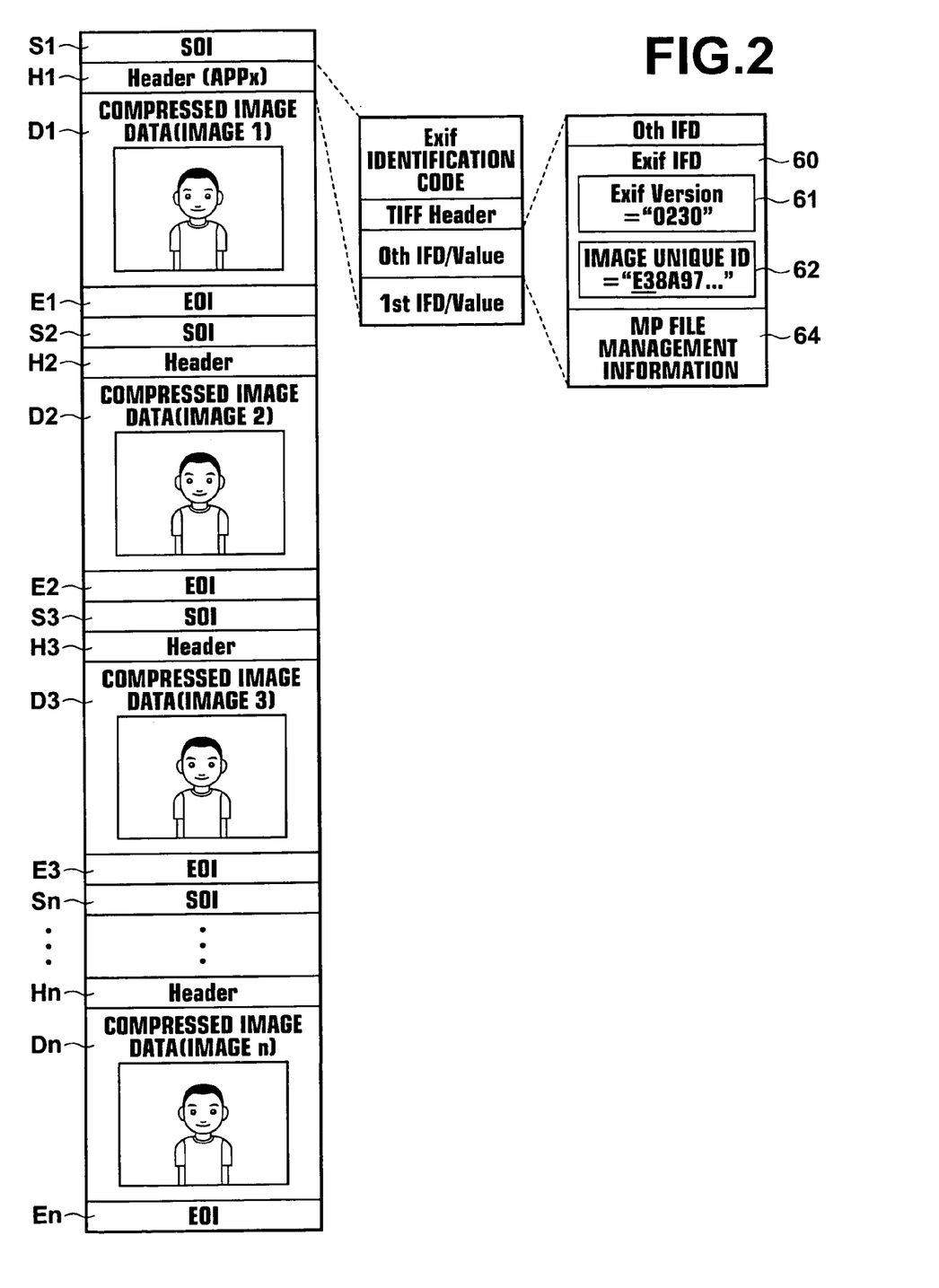
FIG. 2 illustrates an example structure of an image file recorded in multi-page format.

FIG. 2 illustrates an example structure of an image file recorded in the multi-page format. Hereinafter, a method for recording an image file in the multi-page format will be described with reference to FIG. 2. First, a header (APPx, application marker segment) H1 is recorded immediately after an SOI marker that indicates the start of the file. The header (APPX) H1 includes Exif identification code, Tiff Header, and auxiliary information (0th IFD/Value, 1st IFD/Value). 0th IFD/Value includes 0th IFD, Exif IFD, MP file management information and the like, and auxiliary information related to a compressed image is recorded therein. More specifically, a code indicating the standard version of the file, for example, "0230" is recorded in an Exif Version tag area 61 of the Exif IFD, and a code indicating that the file is recorded in multi-page format, for example, "E3" is recorded in the first two bytes of an image unique ID tag area 62 of the Exif IFD. Further, multi-page format (MP) file management information 64 is recorded.

Then, n image data identified as the image data desired to be recorded in the multi-page format are recorded following the header (APPx) H1 delimited by a specific identifier, such as an EOI marker or the like, between each image. An EOI marker E1 is recorded immediately after the front image data (first image data) D1, then an SOI marker S2, a header H2, a second image data D2, an EOI marker E2, an SOI marker S3, a header H3, a third image data D3, an EOI marker E3, and so on with a repetition of similar series of data sets to an SOI marker Sn, a header Hn, an nth image data Dn, and an EOI marker En are recorded sequentially.

Here, the description has been made of a case in which a code indicating that the image file is recorded in the multi-page format, for example, "E3" is recorded in a portion of the image unique ID tag area. But the recording position of the auxiliary information indicating whether or not the image file is recorded in multi-page format is not limited to the image unique ID tag area, and the information may be recorded at any other arbitrarily determined position as long as it is a known position of the header recognizable by an image reader device that reads in the image file and performs processing thereon, such as reproduction and editing processing.

Further, the CPU 32 causes various processing, such as image processing, compression processing, and the like to be performed on single image data obtained by photographing with either one of the imaging units 21A, 21B in the normal mode and the processed image data to be recorded in the normal format, in which single image data are recorded in a single image file, to generate a single image file, which is then stored in the recording medium 29 through the media control unit 26.

Figure 3:
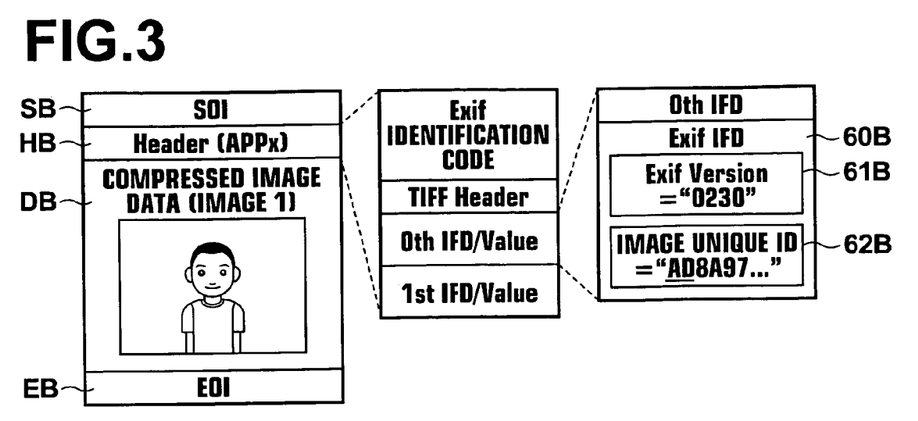
FIG. 3 illustrates an example structure of an image file recorded in normal format.

FIG. 3 illustrates an example structure of an image file recorded in the normal format. The structure of the image file recorded in the normal format shown in FIG. 3 differs from the structure of the image file recorded in the multi-page format shown in FIG. 2 in that a code representing that the file is not recorded in the multi-page format, that is, a code which is different from the code representing that the file is recorded in the multi-page format, for example, "AD" is recorded in the first two bytes of the image unique ID tag area 62 of the Exif IFD, and it does not have the tag area of the multi-page format (MP) file management information 64 shown in FIG. 2. Further, single image data DB and an EOI marker EB are recorded following the header (APPx) HB.

Here, the description has been made of a case in which image data obtained by photographing by the imaging unit or units are recorded in the multi-page format or in the normal format, in which single image data are recorded in a single image file, according to the photographing mode of the photographing. But, for example, a plurality of image data may be read out from the external recording medium 29 and deployed in the frame memory 25. Then, two or more image data may be identified as the image data desired to be recorded in the multi-page format from the deployed image data by the CPU 32 based on the date and time information or subject distance information attached to each image data, or an evaluation result of correlation between the image data, and the identified image data may be recorded in the multi-page format as a single image file as shown in FIG. 2.

Here, the processing for identifying two or more image data desired to be recorded in multi-page format based on the date and time information of the image data is processing performed by the CPU 32 in which the date and time information attached to each image data is referenced and, for example, two or more image data having a time interval between the dates and times which falls within a predetermined time range are assumed to be highly related image data to each other and identified as image data desired to be recorded in the multi-page format.

Note that, two or more highly related image data may be identified based on each type of tag information of imaging conditions, such as subject distance, subject position, scent type, and the like attached to each image data, as well as the date and time information, and so identified images may be determined as the image data desired to be recorded in the multi-page format.

Further, the processing for identifying two or more image data desired to be recorded in the multi-page format based on the evaluation result of correlation between the image data is processing performed by the CPU 32 in which image characteristics, such as color distribution, luminance distribution, shape extraction result (face extraction result, or the like), and the like are obtained from each image data, then a correlation between the image data is calculated with respect to each of the image characteristics, and two or more image data having evaluation values obtained by comprehensively evaluating the calculated correlations greater than a predetermined threshold value are assumed to be highly related image data to each other and identified as the image data desired to be recorded in multi-page format.

Next, image file reproduction processing by the CPU 32 will be described in detail. The CPU 32 determines the operation mode of the camera system 1, and if it is determined to be the reproduction mode, an image file is read out from the external recording medium 29 and deployed in the frame memory 25. Next, a determination is made as to whether or not image data in the image file is likely to have been erroneously erased and if not, the image data of the image file recorded in the frame memory 25 are expanded by the compression/expansion processing unit 24 and displayed on the monitor 20 through the display control unit 28.

Figure 5:
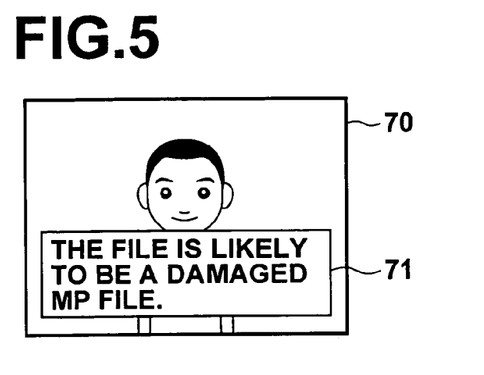
FIG. 5 illustrates an example screen of a monitor indicating that image data are likely to have been erroneously erased.

In the mean time, if it is determined that image data in the image file is likely to have been erroneously erased, the front image data of the image file recorded in the frame memory 25 are expanded by the compression/expansion processing unit 24 and displayed on the monitor 20 through the display control unit 28, and the determination result that erroneous erasure is likely to have occurred is outputted to the display control unit 24 to display a message on the monitor 20 indicating that image data are likely to have been erroneously erased. For example, as shown in FIG. 5, a message 71 like "The file is likely to be a damaged MP file" is displayed on the screen 70 of the monitor 20 together with the front image.

Further, where a determination is made that erroneous erasure is likely to have occurred, auxiliary information may be attached to the image file indicating that erroneous erasure of image data is likely to have occurred in the image file, together with or without the display described above.

Figure 6:
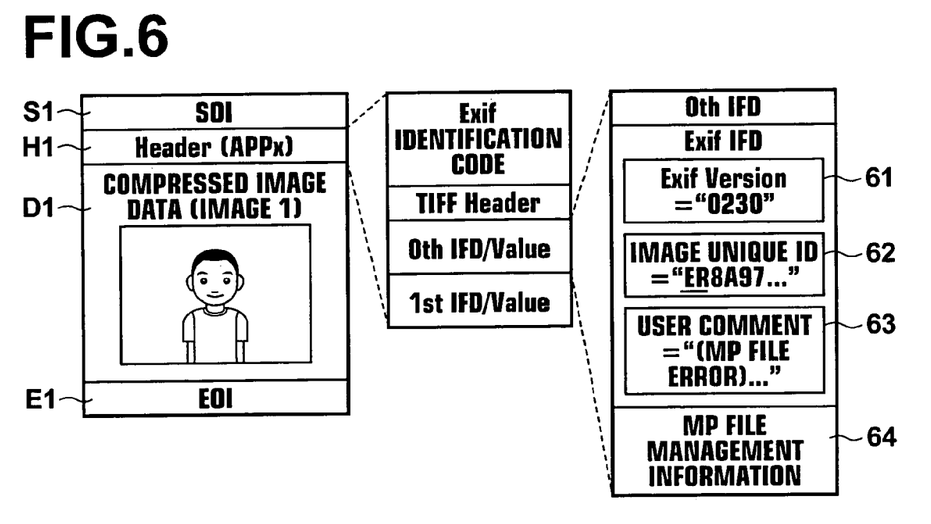
FIG. 6 illustrates a manner of attaching auxiliary information to an image file indicating that image data are likely to have been erroneously erased.

For example, as shown in FIG. 6, an error code representing the likelihood of erroneous erasure of image data in the image file, for example, "ER" may be recorded in the first two bytes of the image unique ID tag area 62 of the Exif IFD. Alternatively, an error information comment indicating that erroneous erasure of image data is likely to have occurred in the image file, for example, "(MP file error)" may be additionally recorded in the beginning of the existing user comment of user comment tag area 63 which is a tag provided for the user for writing a key word or a comment for the image file.

Once the auxiliary information indicating that erroneous erasure of image data is likely to have occurred in an image file is attached to the image file by the illustrated methods described above, the likelihood of erroneous erasure of image data may be easily recognized by referring to the auxiliary information, thereby image data management capability may be improved.

Figure 4:
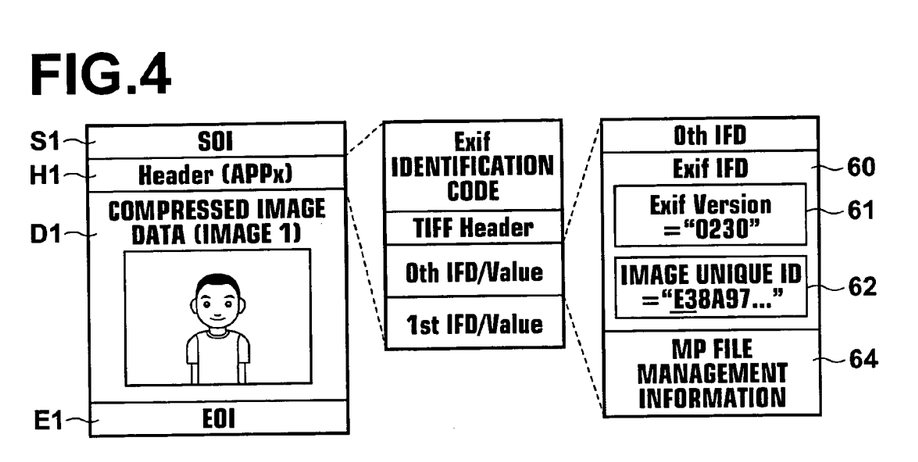
FIG. 4 illustrates an example structure of an image file in which image data are erroneously erased.

Hereinafter, determination processing by the CPU 32 for the likelihood of erroneous erasure of image data in an image file will be described in detail.

Where an image file recorded in the multi-page format is edited using image software of image editing device or the like that can recognize only one front image data, image data recorded following the front image data may possibly be erroneously erased. In the image file in which image data recorded following the front image data have been erroneously erased by this, a code indicating that the file is recorded in the multi-page format, for example, "E3" is recorded in the first two bytes of the image unique ID tag area 62 of the Exif IFD, but, for example, the file includes only single image data as shown in FIG. 4.

With respect to such an image file, the CPU 32 performs format judgment processing for judging whether or not the image file is recorded in the multi-page format and image data count judgment processing for judging whether or not two or more image data are recorded. Then, the CPU 32 determines that image data in the image file are likely to have been erroneously erased if the image file is judged as recorded in the multi-page format and judged that two or more image data are not recorded.

In the format judgment processing, the code recorded in the first two bytes of the image unique ID tag area of the Exif IFD, that is, auxiliary information indicating whether or not the image file is recorded in the multi-page format is referenced to determine whether or not the image file is recorded in the multi-page format. More specifically, if "E3" which is defined as the code indicating that the image file is recorded in the multi-page format is recorded in the first two bytes of the image unique ID tag area of the Exif IFD, the image file is judged as recorded in the multi-page format, and if a code different from "E3" is recorded, the image file is judged as recorded in the normal format in which single image data are recorded in a single image file.

In the image data count judgment processing, for example, where the multi-page format is of a type that records a plurality of image data in a single image file by delimiting each image data by a specific identifier, such as an EOI marker or the like, a judgment as to whether or not two or more image data are recorded in the image file is made based on whether or not image data are present following the specific identifier, such as the EOI marker or the like, first appearing in the image file. Further, as shown in FIGS. 2 and 3, in a case in which if two or more image data are recorded in the image file, there is at least one location in the JPEG marker stream where an EOI marker is followed by an SOI marker and if only one image data are recorded in the image file, there is no such location, a judgment may be made as to whether or not two or more image data are recorded in the image file by checking to see if there is one or more locations in the JPEG marker stream where an EOI marker is followed by an SOI marker.

The CPU 32 may perform the format judgment processing and image data count judgment processing on all target image files for determining the likelihood of erroneous erasure of image data and determine the likelihood of erroneous erasure based on both of the results. Alternatively, the CPU 32 may perform either one of the format judgment processing and image data count judgment processing first, and then the other processing is performed only when it is determined necessary based on the determination result in order to determine the likelihood of erroneous erasure, and may determine the likelihood of erroneous erasure based on these determination results.

For example, the format judgment processing is performed first, and if the image file is judged as recorded in the normal format in which single image data are recorded in a single image file, it is determined that image data in the image file are not likely to have been erroneously erased, while if the image file is judged as recorded in the multi-page format, the image data count judgment processing is further performed. In the image data count judgment processing, if it is judged that two or more image data are recorded, it may be determined that image data in the image file are not likely to have been erroneously erased, while if it is judged that two or more image data are not recorded, it may be determined that image data in the image file are likely to have been erroneously erased. Likewise, the image data count judgment processing may be performed first, and then the format judgment processing is further performed only when it is judged that two or more image data are not recorded. Then, if the image file is judged as recorded in the multi-page format, a determination may be made that image data in the image file are likely to have been erroneously erased.

Figure 7:
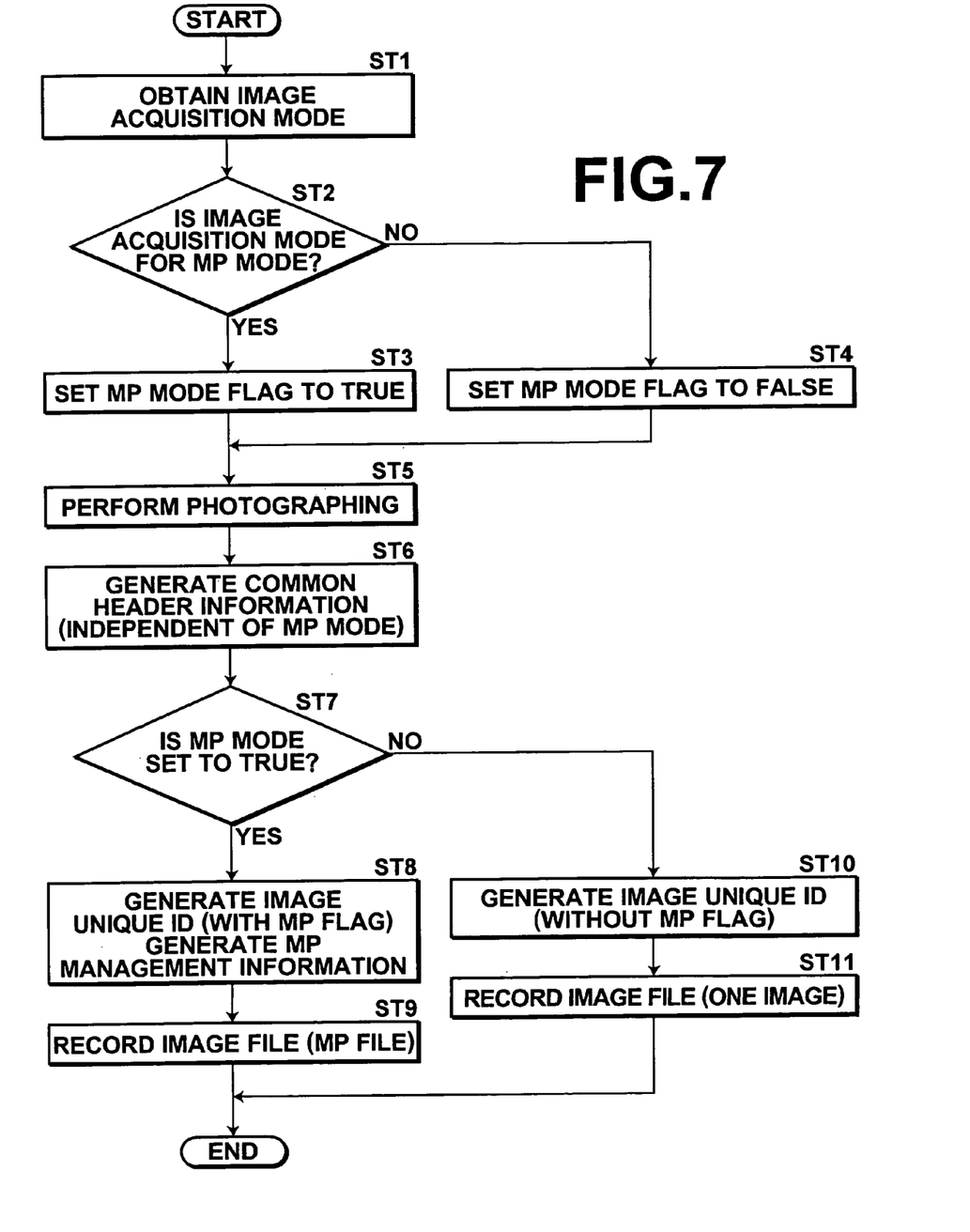
FIG. 7 is a flowchart illustrating an image file generation process performed by the camera system shown in FIG. 1.

Next, an example image file generation process performed by the camera system 1 will be described with reference to FIG. 7. First, the user operates the operation unit 33 to select the photographing mode of the camera system 1 (step ST1). Then, the selection information of the photographing mode is received by the CPU 32 from the operation unit 33, and a determination is made as to whether or not the selected photographing mode is one of the action mode, bracket mode, panorama mode, stereoscopic mode, and multiview image mode (step ST2). If step ST2 is positive, the mode flag of multi-page format (MP) is set to TRUE and stored in the internal memory 27 (step ST3). On the other hand, if step ST2 is negative, the mode flag of multi-page format (MP) is set to FALSE and stored in the internal memory 27 (step ST4). Thereafter, photographing is performed by either one of the imaging units 21A, 21B or by both according to the selected photographing mode in step ST1, and image data obtained by the photographing are stored in the frame memory 25 after various processing, including compression, is performed thereon (step ST5). Then, common header information is generated by the CPU 32 regardless of whether or not the mode flag of the multi-page format (MP) is TRUE when generating an image file (step ST6). Then, a determination is made as to whether or not the mode flag of the multi-page format (MP) is TRUE (step ST7). If the step ST7 is positive, a code representing that the image file is recorded in the multi-page format is recorded in the first two bytes of an image unique ID tag area of the Exif IFD, and MP management information is recorded to generate the header of the image file (step ST8). Then, an image file in the multi-page format is generated by reading out the two or more image data recorded in the frame memory 25 in step ST5 and recording the readout two or more image data following the header generated in step ST8 delimited by a specific identifier, such as an EOI marker or the like, between each image data (step ST9), which is then stored in the recording medium 29 through the media control unit 26.

In the mean time, if step ST7 is negative, a code representing that the image file is not recorded in the multi-page format, that is, a code which is different from the code representing that the file is recorded in the multi-page format is recorded in the first two bytes of the image unique ID tag area of the Exif IFD to generate the header of the image file (step ST10). Then, an image file in the normal format is generated by reading out the single image data recorded in the frame memory 25 in step ST5 and recording the readout single image data following the header generated in step ST10 (step ST11), which is then stored in the recording medium 29 through the media control unit 26.

Figure 8:
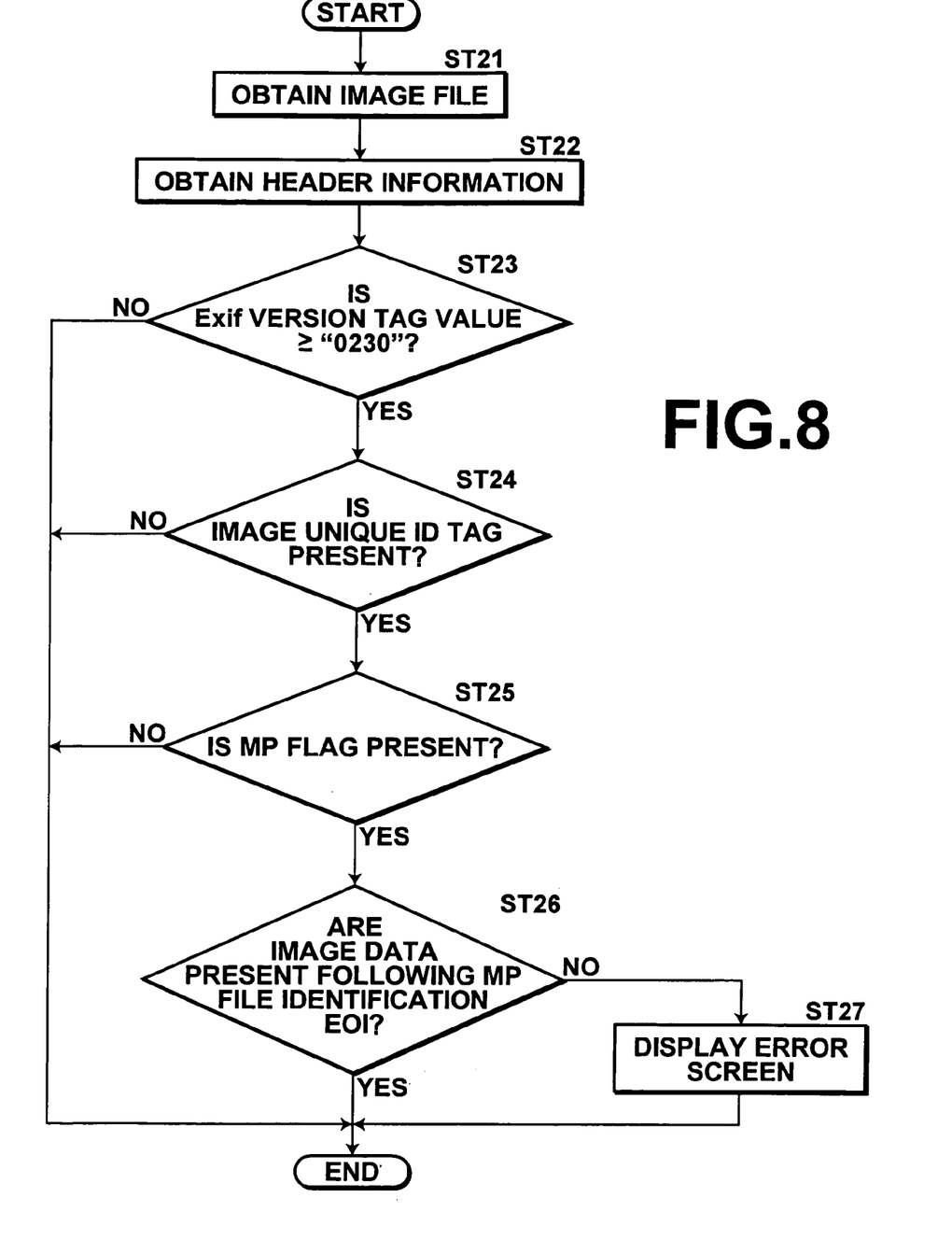
FIG. 8 is a flowchart illustrating an erroneous erasure determination process performed by the camera system shown in FIG. 1.

Next, an example erroneous erasure determination process (image file reproduction process) performed by the camera system 1 will be described with reference to FIG. 8. First, an image file is read out from the external recording medium 29 and deployed in the frame memory 25 by the CPU 32 (step ST21). Then, the header information of the image file deployed in the frame memory 25 is obtained (step ST22), and a determination is made as to whether or not the Exif Version tag value recorded in the Exif Version tag area of the header is greater than or equal to "0230" (step ST23). If step ST23 is negative, it is determined that image data in the image file are not likely to have been erroneously erased, and the process is terminated. On the other hand, if step ST23 is positive, a determination is made as to whether or not the image unique ID tag is present in the header of the image file (step ST24). If the step ST24 is negative, it is determined that image data in the image file are not likely to have been erroneously erased and the process is terminated.

On the other hand, if step ST24 is positive, a determination is made as to whether or not the file is recorded in the multi-page format by referring to the code recorded in the first two bytes of the image unique ID tag area, that is, the auxiliary information indicating whether or not the image file is recorded in the multi-page format (step ST25). If step ST25 is negative, it is determined that image data in the image file are not likely to have been erroneously erased and the process is terminated. If step ST25 is positive, a determination is made as to whether or not image data are recorded following the specific identifier, such as an EOI marker or the like, first appearing in the image file (step ST26). If step ST26 is positive, it is determined that image data in the image file are not likely to have been erroneously erased (step ST26) and the process is terminated.

On the other hand, if step ST26 is negative, it is determined that image data in the image file are likely to have been erroneously erased, and the front image data of the image file recorded in the frame memory 25 are expanded by the compression/expansion processing unit 24 and displayed on the monitor 20 through the display control unit 28, and at the same time the determination result that erroneous erasure is likely to have occurred is outputted to the display control unit 28 to display a message on the monitor 20 indicating that image data are likely to have been erroneously erased (step ST27).

Figure 9:
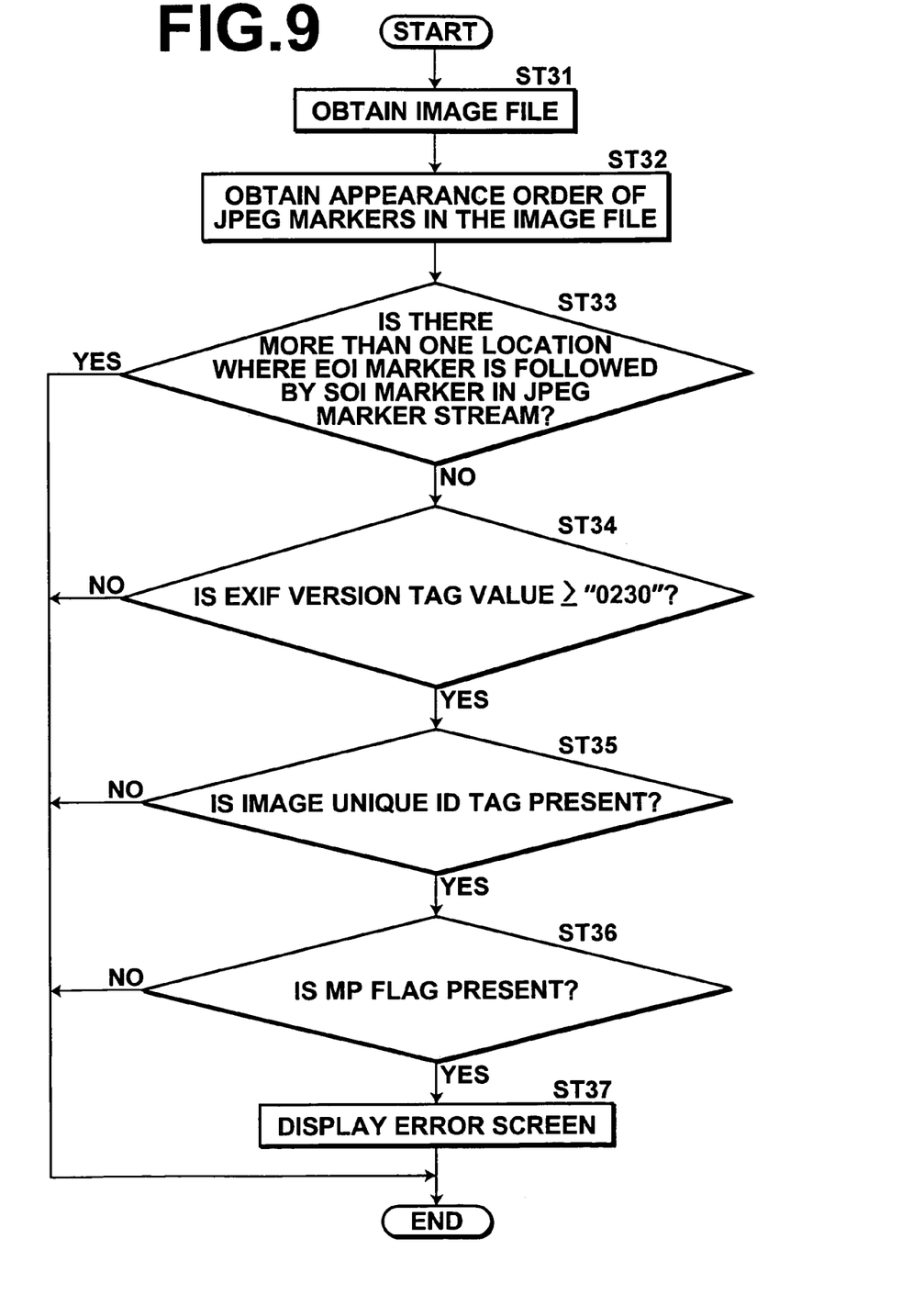
FIG. 9 is a flowchart illustrating an erroneous erasure determination process performed by the camera system shown in FIG. 1.

Next, another example of erroneous erasure determination process (image file reproduction process) performed by the camera system 1 will be described with reference to FIG. 9. First, an image file is read out from the external recording medium 29 and deployed in the frame memory 25 by the CPU 32 (step ST31). Then, the data in the image file deployed in the frame memory 25 are scanned sequentially from the front data to obtain the appearance order of JPEG markers (step ST32), in order to determine whether or not there is one or more locations where an EOI marker is followed by an SOI marker (step ST33). If step ST33 is positive, it is determined that image data in the image file are not likely to have been erroneously erased, and the process is terminated.

In the mean time, if step ST33 is negative, a determination is made as to whether or not the Exif Version tag value recorded in the Exif Version tag area of the header is greater than or equal to "0230" (step ST34). If step ST34 is negative, it is determined that image data in the image file are not likely to have been erroneously erased, and the process is terminated. On the other hand, if step ST34 is positive, a determination is made as to whether or not the image unique ID tag is present in the header of the image file (step ST35). If step ST35 is negative, it is determined that image data in the image file are not likely to have been erroneously erased, and the process is terminated. On the other hand, if step ST35 is positive, a judgment is made as to whether or not the file is recorded in the multi-page format by referring to the code recorded in the first two bytes of the image unique ID tag area, that is, the auxiliary information indicating whether or not the image file is recorded in the multi-page format (step ST36). If step ST36 is negative, it is determined that image data in the image file are not likely to have been erroneously erased, and the process is terminated. In the mean time, if step ST36 is positive, it is determined that image data in the image file are likely to have been erroneously erased, and the front image data of the image file recorded in the frame memory 25 are expanded by the compression/expansion processing unit 24 and displayed on the monitor 20 through the display control unit 28, and at the same time the determination result that erroneous erasure is likely to have occurred is outputted to the display control unit 28 to display a message on the monitor 20 indicating that image data are likely to have been erroneously erased (step ST37).

In the present embodiment, the description has been made of a case in which the erroneous erasure determination apparatus and image file generation apparatus of the present invention are applied to the camera system 1. But the erroneous erasure determination apparatus and image file generation apparatus of the present invention may also be realized by executing the image file generation program and erroneous erasure determination program read in an auxiliary storage device on a computer (e.g., personal computer). Here, the image file generation program and erroneous erasure determination program are stored in information recording media, or distributed through a network, such as the Internet, and installed on the computer.

Figure 10:
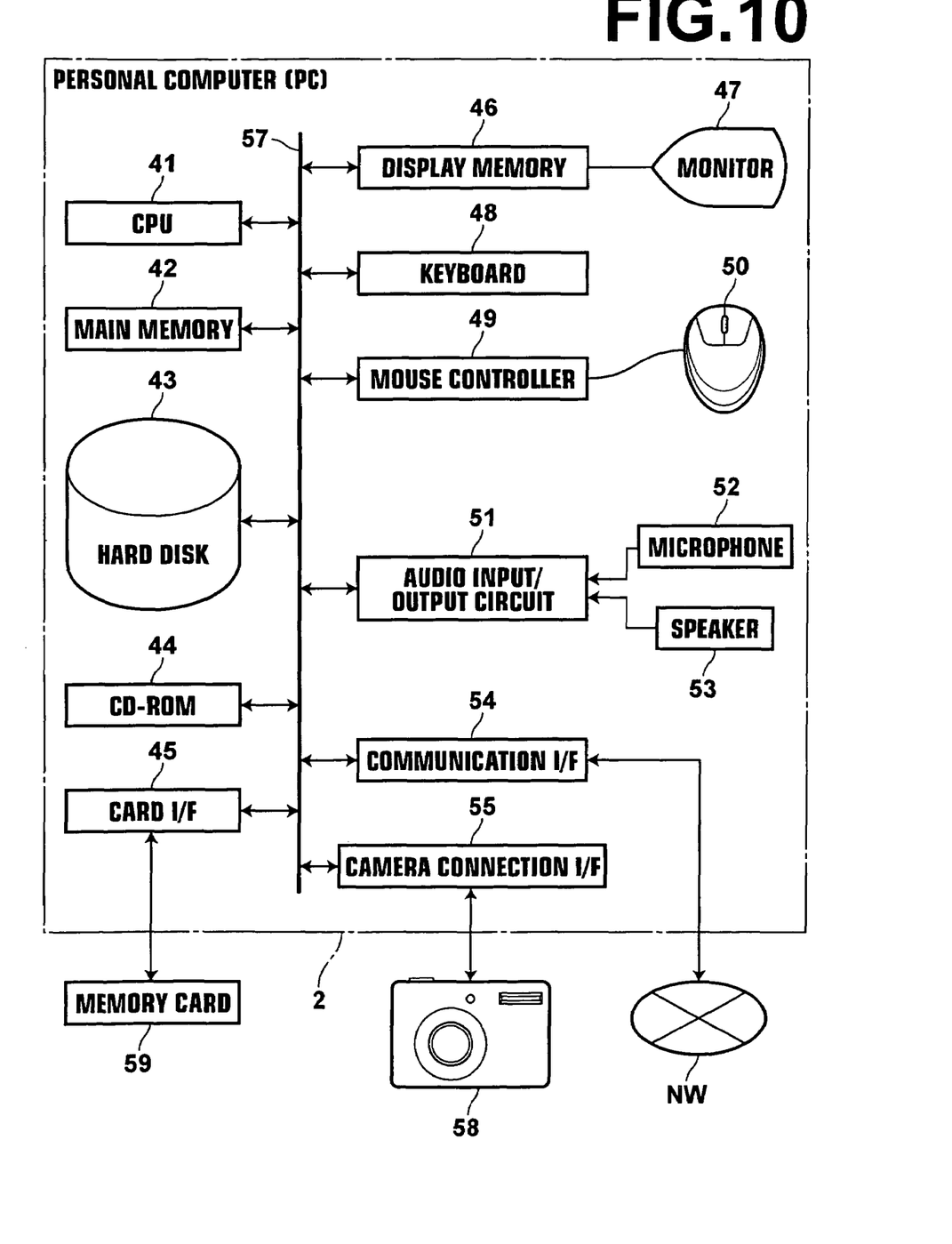
FIG. 10 is a schematic block diagram of a personal computer according to the present invention, illustrating a configuration thereof.

Hereinafter, a description will be made of a case in which the erroneous erasure determination apparatus and image file generation apparatus of the present invention are applied to a personal computer (PC) 2. FIG. 10 is a schematic block diagram of the personal computer 2, illustrating a configuration thereof. The personal computer 2 includes a CPU 41, a main memory 42, a hard disk 43, a card I/F 45, a display memory 46, a keyboard 48, a mouse controller 49, an audio input/output circuit 51, a communication I/F 54, and a camera connection I/F 55, and the like, which send and receive various signals and data through a data bus 57.

A CD-ROM 44 has stored therein various programs executed by the CPU 41, including the image file generation program and erroneous erasure determination program according to the present invention. The CPU 41 controls each unit of the personal computer 2 by the programs stored in the CD-ROM 44.

First, image file generation processing performed by the CPU 41 by controlling each unit of the personal computer 2 using the image file generation program stored in the CD-ROM 44 will be described. A plurality of image data are read out from an external camera system 58 through the camera connection I/F 55 or from an external memory card 59 through the card I/F 45 and deployed in the main memory 42. Then, two or more image data assumed to have a high relation to each other are identified as the image data desired to be recorded in the multi-page format from the image data deployed in the main memory 42 based on the date and time information attached to each image data and evaluation result of correlation between the image data and, as in the image file generation processing in the camera system 1 described above, a single image file in which the identified image data are recorded in the multi-page format shown in FIG. 2 is generated, and the generated image file is stored in the main memory 42 or in the external memory card 59 through the card I/F 45.

Next, erroneous erasure determination processing for determining the likelihood of erroneous erasure of image data in an image file recorded in the multi-page format performed by the CPU 41 by controlling each unit of the personal computer 2 using the erroneous erasure determination program stored in the CD-ROM 44 will be described. An image file is read out from an external camera system 58 through the camera connection I/F 55 or from an external memory card 59 through the card I/F 45 and deployed in the main memory 42. Then, as in the erroneous erasure determination processing (image file reproduction processing) in the camera system 1 described above, judgment processing for judging whether or not the image file is a file recorded in the multi-page format by checking to see if "E3" which is defined as the code representing that the image file is recorded in the multi-page format is recorded in the first two bytes of the image unique ID tag area of the Exif IFD of the image file deployed in the main memory 42 and processing for judging whether or not two or more image data are recorded in the image file by judging whether or not image data are present following a specific identifier, such as the EOI marker or the like, first appearing in the image file are preformed. Then, if the image file is judged as recorded in the multi-page format and judged that two or more image data are not recorded, then it is determined that image data in the image file are likely to have been erroneously erased. Where it is determined that image data in the image file are likely to have been erroneously erased, the determination result that erroneous erasure is likely to have occurred is outputted to the display memory 46 to display a message, for example like that shown in FIG. 5, on the monitor 47 indicating that image data are likely to have been erroneously erased. Further, auxiliary information may be attached to the image file indicating that erroneous erasure of image data is likely to have occurred in the image file, together with or without the display described above in the manner, for example, as shown in FIG. 6.

According to each of the embodiments described above, a determination is made as to whether or not image data in an image file are likely to have been erroneously erased based on auxiliary information attached thereto which indicates whether or not the image file is recorded in the multi-page format in which a plurality of image data are recorded in a single image file, and information that indicates the number of image data recorded in the image file, so that the likelihood of erroneous erasure of image data in an image file may be determined.

In particular, where the image file originally included three or more image data of a multiview image recorded in the multi-page format and some of the image data have been erroneously erased, if two or more image data remains in the file, the remaining image data may be used as the multiview image or erased images may be estimated and reproduced from the remaining image data. Where only one image data remains due to erroneous erasure, however, the image data can not be used as the multiview image. Accordingly, it is highly advantageous that the present invention is capable of determining whether or not two or more image data remain in multiview image data.

The erroneous erasure determination apparatus and image file generation apparatus of the present invention are applicable not only to a camera system and a personal computer but also to various types of apparatuses that record an image file in the multi-page format, or reproduce and edit an image file recorded in the multi-page format. For example, the apparatuses are applicable to a medical image management system for recording, reproducing, and editing multitudes of image data obtained by medical imaging systems, such as CT, MRI, ultrasonograph, and the like, an image reproduction apparatus, such as a photo viewer, for reproducing an image recorded in a recording medium, an image server system that provides on-line album service through a network, such as the Internet, and the like.

What is claimed is:

1. An erroneous erasure determination apparatus, comprising:
    an erroneous erasure determination means for determining whether image data in an image file are likely to have been erroneously erased based on auxiliary information attached thereto which indicates whether the image file is recorded in a multi-page format, and information which indicates a number of image data recorded in the image file,
    wherein the erroneous erasure determination means comprises:
        a format judging unit that judges whether the image file comprises a file recorded in the multi-page format based on the auxiliary information; and
        an image data count judging unit that judges whether two or more image data are recorded in the image file, and determines that image data in the image file are likely to have been erroneously erased when the image file is judged by the format judging unit as recorded in the multi-page format and judged by the image data count judging unit that two or more image data are not recorded in the image file.

2. The erroneous erasure determination apparatus as claimed in claim 1, wherein the image data count judging unit comprises a unit that judges whether two or more image data are recorded in the image file judged by the format judging unit as recorded in the multi-page format.

3. The erroneous erasure determination apparatus as claimed in claim 1, wherein the auxiliary information is recorded at a known position of a header of the image file.

4. The erroneous erasure determination apparatus as claimed in claim 1, wherein the multi-page format comprises a recording format, in which a plurality of image data are recorded in a single image file delimited by a specific identifier between each image data, and
    wherein the image data count judging unit comprises a unit that judges whether two or more image data are recorded in the image file based on whether image data are present following a specific identifier first appearing in the image file.

5. The erroneous erasure determination apparatus as claimed in claim 1, wherein the erroneous erasure determination means comprises a means that, when determined that erroneous erasure is likely to have occurred, outputs the determination result.

6. The erroneous erasure determination apparatus as claimed in claim 1, wherein the apparatus further comprises a display means, and
    wherein the erroneous erasure determination means comprises a means that, when determined that erroneous erasure is likely to have occurred, outputs a determination result that erroneous erasure is likely to have occurred to the display means to cause the display means to display that image data are likely to have been erroneously erased.

7. The erroneous erasure determination apparatus as claimed in claim 1, wherein the erroneous erasure determination means comprises a means that, when determined that erroneous erasure is likely to have occurred, attaches auxiliary information to the image file indicating that erroneous erasure of image data is likely to have occurred in the image file.

8. The erroneous erasure determination apparatus as claimed in claim 4, wherein the specific identifier comprises an EOI (End Of image) marker.

9. The erroneous erasure determination apparatus as claimed in claim 3, wherein the known position comprises a portion of an image unique ID tag area of a format standard Exif.

10. An erroneous erasure determination method, comprising:
    determining whether image data in an image file are likely to have been erroneously erased based on auxiliary information attached thereto which indicates whether the image file is recorded in a multi-page format, and information which indicates a number of image data recorded in the image file,
    wherein the determining whether the image data in the image file are likely to have been erroneously erased comprises:
        a format judging to judge whether the image file comprises a file recorded in the multi-page format based on the auxiliary information; and
        an image data count judging to judge whether two or more image data are recorded in the image file, and to determine that image data in the image file are likely to have been erroneously erased when the image file is judged by the format judging unit as recorded in the multi-page format and judged in the image data count judging that two or more image data are not recorded in the image file.

11. A non-transitory computer readable recording medium on which is recorded a program for causing a computer to determine whether image data in an image file are likely to have been erroneously erased based on auxiliary information attached thereto which indicates whether the image file is recorded in a multi-page format, and information which indicates a number of image data recorded in the image file,
    wherein the determining whether the image data in the image file are likely to have been erroneously erased comprises:
        a format judging to judge whether the image file comprises a file recorded in the multi-page format based on the auxiliary information; and
        an image data count judging to judge whether two or more image data are recorded in the image file, and to determine that image data in the image file are likely to have been erroneously erased when the image file is judged by the format judging unit as recorded in the multi-page format and judged in the image data count judging that two or more image data are not recorded in the image file.

12. An erroneous erasure determination apparatus, comprising:

an erroneous erasure determination means for determining whether image data in an image file are likely to have been erroneously erased based on auxiliary information attached thereto which indicates whether the image file is recorded in a multi-page format, and information which indicates a number of image data recorded in the image file, wherein the erroneous erasure determination means comprises an image data count judging unit that judges whether two or more image data are recorded in the image file.

13. The erroneous erasure determination apparatus as claimed in claim 12, wherein the erroneous erasure determination means further comprises a format judging unit that judges whether the image file comprises a file recorded in the multi-page format based on the auxiliary information, and determines that image data in the image file are likely to have been erroneously erased when the image file is judged by the format judging unit as recorded in the multi-page format and judged by the image data count judging unit that two or more image data are not recorded in the image file.

14. The erroneous erasure determination apparatus as claimed in claim 12, wherein the image data count judging unit comprises a unit that judges whether two or more image data are recorded in the image file judged by the format judging unit as recorded in the multi-page format.

15. The erroneous erasure determination apparatus as claimed in claim 12, wherein the auxiliary information is recorded at a known position of a header of the image file.

16. The erroneous erasure determination apparatus as claimed in claim 12, wherein the multi-page format comprises a recording format, in which a plurality of image data are recorded in a single image file delimited by a specific identifier between each image data, and wherein the image data count judging unit comprises a unit that judges whether two or more image data are recorded in the image file based on whether image data are present following a specific identifier first appearing in the image file.

17. The erroneous erasure determination apparatus as claimed in claim 12, wherein the erroneous erasure determination means comprises a means that, when determined that erroneous erasure is likely to have occurred, outputs the determination result.

18. The erroneous erasure determination apparatus as claimed in claim 12, wherein the apparatus further comprises a display means, and wherein the erroneous erasure determination means comprises a means that, when determined that erroneous erasure is likely to have occurred, outputs a determination result that erroneous erasure is likely to have occurred to the display means to cause the display means to display that image data are likely to have been erroneously erased.

19. The erroneous erasure determination apparatus as claimed in claim 12, wherein the erroneous erasure determination means comprises a means that, when determined that erroneous erasure is likely to have occurred, attaches auxiliary information to the image file indicating that erroneous erasure of image data is likely to have occurred in the image file.

20. The erroneous erasure determination apparatus as claimed in claim 16, wherein the specific identifier comprises an EOI (End Of Image) marker.

21. The erroneous erasure determination apparatus as claimed in claim 15, wherein the known position comprises a portion of the image unique ID tag area of a format standard Exif.

22. An erroneous erasure determination method, comprising:

determining whether image data in an image file are likely to have been erroneously erased based on auxiliary, information attached thereto which indicates whether the image file is recorded in a multi-page format, and information which indicates a number of image data recorded in the image file, wherein the determining whether the image data in the image file are likely to have been erroneously erased comprises an image data count judging to judge whether two or more image data are recorded in the image file.

23. A non-transitory computer readable recording medium on which is recorded a program for causing a computer to determine whether image data in an image file are likely to have been erroneously erased based on auxiliary information attached thereto which indicates whether the image file is recorded in a multi-page format, and information which indicates a number of image data recorded in the image file, wherein the determining whether the image data in the image file are likely to have been erroneously erased comprises an image data count judging to judge whether two or more image data are recorded in the image file.

* * * * *